United States Patent
Cao et al.

(10) Patent No.: US 10,555,226 B2
(45) Date of Patent: *Feb. 4, 2020

(54) DETERMINING A LOCATION OF A MOBILE DEVICE

(71) Applicant: INTERNATIONAL BUSINESS MACHINES CORPORATION, Armonk, NY (US)

(72) Inventors: Heng Cao, Beijing (CN); Wei Shan Dong, Beijing (CN); Chun Yang Ma, Beijing (CN); Ju Wei Shi, Beijing (CN); Chunhua Tian, Beijing (CN); Yu Wang, Beijing (CN); Chao Zhang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 75 days.

This patent is subject to a terminal disclaimer.

(21) Appl. No.: 15/273,751

(22) Filed: Sep. 23, 2016

(65) Prior Publication Data

US 2017/0013522 A1 Jan. 12, 2017

Related U.S. Application Data

(63) Continuation of application No. 14/801,139, filed on Jul. 16, 2015.

(30) Foreign Application Priority Data

Jul. 16, 2014 (CN) .......................... 2014 1 0337953

(51) Int. Cl.
*H04W 36/00* (2009.01)
*H04W 64/00* (2009.01)
(Continued)

(52) U.S. Cl.
CPC ....... *H04W 36/0094* (2013.01); *G01S 5/0278* (2013.01); *H04M 3/2218* (2013.01);
(Continued)

(58) Field of Classification Search
CPC ............... H04W 28/04; H04W 64/003; H04W 36/0094
(Continued)

(56) References Cited

U.S. PATENT DOCUMENTS 7,296,261 B2 11/2007 Witchel et al.
8,042,097 B2 10/2011 Aridor et al.
(Continued)

FOREIGN PATENT DOCUMENTS

CN 101212808 A 7/2008
CN 101369970 2/2009
(Continued)

OTHER PUBLICATIONS

Beat The GMAT, Dec. 8, 2017, pp. 1-3.*
(Continued)

*Primary Examiner* — Joel Ajayi
(74) *Attorney, Agent, or Firm* — Amin, Turocy & Watson, LLP

(57) ABSTRACT

A method and an apparatus for determining a location of a mobile device. The location of a mobile device is determined accurately according to information which includes call data records of the mobile device. By employing a partial ellipse integral model, two physical world factors are taken into consideration in reducing the location uncertainty in call data records. The factors include: spatiotemporal constraints of the device's movement in the physical world and the telecommunication cell area's geometry information, which increase the accuracy of determining the location of a mobile device.

7 Claims, 6 Drawing Sheets

(51) Int. Cl.
*H04M 3/22* (2006.01)
*G01S 5/02* (2010.01)
*H04W 36/32* (2009.01)

(52) U.S. Cl.
CPC ......... *H04W 36/32* (2013.01); *H04W 64/006* (2013.01); *H04W 36/0083* (2013.01); *H04W 64/00* (2013.01)

(58) Field of Classification Search
USPC .......................................................... 455/440
See application file for complete search history.

(56) References Cited

U.S. PATENT DOCUMENTS

| | | | |
|---|---|---|---|
| 8,132,157 B2 | 3/2012 | Dhuvur et al. | |
| 8,494,554 B2 | 7/2013 | Marti et al. | |
| 8,495,572 B2 | 7/2013 | Bernin | |
| 8,533,668 B2 | 9/2013 | de Oliveira Costa | |
| 8,615,255 B1 | 12/2013 | Zang et al. | |
| 8,825,407 B2 | 9/2014 | Brennan et al. | |
| 9,615,202 B2* | 4/2017 | Dal Santo | H04W 4/029 |
| 2009/0156231 A1* | 6/2009 | Versteeg | G01S 5/0252 455/456.1 |
| 2010/0299654 A1 | 11/2010 | Vaswani et al. | |
| 2013/0053056 A1 | 2/2013 | Aggarwal et al. | |
| 2013/0166209 A1* | 6/2013 | Pollington | G06Q 10/06 701/540 |
| 2014/0004875 A1 | 1/2014 | Agarwal et al. | |
| 2014/0011513 A1 | 1/2014 | Watts et al. | |

FOREIGN PATENT DOCUMENTS

| | | |
|---|---|---|
| CN | 102110048 A | 12/2009 |
| CN | 101827180 | 9/2010 |
| WO | 2005009020 A1 | 1/2005 |

OTHER PUBLICATIONS

Smoreda et. al, "Spatiotemporal data from mobile phones for personal mobility assessment," Transport Survey Methods: Best Practice for Decision Making, 2013, Emerald Publishing.
Cornish, et al. "Mobile Phone Network Data for Development," UN Global Pulse, Oct. 2013.
Calabrese, et al. Real-Time Urban Monitoring Using Cell Phones: A Case Study in Rome, IEEE Transactions on Intelligent Transportation Systems, Mar. 2011, p. 141-151, vol. 12, No. 1.
Gonzalez, et al. "Understanding Individual Human Mobility Patterns," Nature, vol. 453, p. 779-782, Jun. 2008.
Girardin, et al., "Quantifying Urban Attractiveness from the Distribution and Density of Digital Footprints," International Journal of Spatial Data Infrastructures Research, vol. 4 p. 175-200, 2009.
Traag, et al., "Social Event Detection in Massive Mobile Phone Data Using Probabilistic Location Inference," IEEE International Conference on Privacy, Security, Risk, and Trust, and IEEE International Conference on Social Computing, 2011.
Wang, et al., "Transportation Mode Inference from Anonymized and Aggregated Mobile Phone Call Detail Records," 13th International IEEE Annual Conference on Intelligent Transportation Systems, Sep. 19-22, 2010.
Kumar, et al., "Multi-Sensor Data Fusion in Presence of Uncertainty and Inconsistency in Data," Sensor and Data Fusion, Feb. 2009.
List of IBM Patents or Patent Applications Treated as Related.
Raghavender, Bandi et al., Semantic Differences and Graphical View of Files, Tekniska Hogskolan, Master Thesis 2009, p. 1-42, Jonkoping, Sweden.
Office Action for U.S. Appl. No. 14/801,139 dated Jun. 27, 2016, 17 pages.
Notice of Allowance for U.S. Appl. No. 14/801,139 dated Dec. 28, 2016, 33 pages.
Notice of Allowance for U.S. Appl. No. 14/801,139 dated Sep. 14, 2017, 18 pages.
Wang et al., "Transportation Mode Inference from Anonymized and Aggregated Mobile Phone Call Detail Records," 13th International IEEE Annual Conference on Intelligent Transportation Systems, 2010, 6 pages.

* cited by examiner

DETERMINING A LOCATION OF A MOBILE DEVICE

CROSS-REFERENCE TO RELATED APPLICATION

This application is a continuation of U.S. patent application Ser. No. 14/801139 filed on Jul. 16, 2015, which claims the benefit of priority to Chinese Patent Application No. 201410337953.7, filed Jul. 16, 2014, the contents of which are incorporated herein by reference.

TECHNICAL FIELD

The present invention relates to locating a mobile device, and more specifically, to a method and an apparatus for determining a location of a mobile device.

BACKGROUND

A Call Data Record ("CDR", also known as Call Detail Record) is a data record which is generated at a telecommunication provider and is related to setup and termination of a call performed by a user through a mobile device and/or any form of data update performed by the mobile device. The CDR can adopt different formats depending on different telecom providers, and can record location information of the mobile device (and of the user who holds the mobile device) and time information of the call. For example, the CDR can include information indicating an initiator of the call (e.g., an ID of the mobile device), information indicating a cell where the initiator initiates the call (e.g., an ID of the cell), information indicating a time at which the initiator initiates the call, information indicating a receiver of the call (e.g., an ID of a mobile device), information indicating a cell where the receiver is located (e.g., an ID of the cell), and a duration of the call. In many applications such as Smarter City, the CDR has become an important data source to predict traffic state changes of the city and the like, through analysis of which the location of the mobile device or the user and a changing trend thereof can be determined.

However, if the location of the mobile device is determined based on the CDR alone, only the cell where the mobile device is located can be determined. The coverage of the cell is relatively large, the location of the mobile device is determined with a low accuracy. Due to changes in wireless signal strength, when the mobile device is located at an edge of the cell, it can be handed over between the cell and an adjacent cell repeatedly. In this case, the accuracy is low because the location of the mobile device is determined based on an uncertain CDR.

SUMMARY

In view of the above, the present invention provides a method and an apparatus for determining a location of a mobile device more accurately according to CDRs of the mobile device and other information.

According to an aspect of the present invention, there is provided a method for determining a location of a mobile device. The CDRs of the mobile device are analyzed to determine a first cell where the mobile device resided and time which the mobile device spent in moving from the first cell to a second cell. Probability densities are determined for the mobile device which is located at respective locations within the first cell, based on a moving speed of the mobile device and the time. The probability densities determine possible locations of the mobile device within the first cell.

According to another aspect of the present invention, there is provided an apparatus for determining a location of a mobile device. An analyzing device is configured to analyze CDRs of the mobile device to determine a first cell where the mobile device resided and time which the mobile device spent in moving from the first cell to a second cell. A probability density determining device is configured to determine probability densities that the mobile device was located at respective locations within the first cell, based on a moving speed of the mobile device and the time. A location determining device is configured to determine possible locations of the mobile device within the first cell, according to the probability densities.

To determine the location with a higher accuracy using the method and the apparatus according to the above aspects of the present invention, the location of the mobile device is determined by the CDRs of the mobile device (the cell where it resided and the cell to which it is handed over) and the moving ability of the mobile device per se is taken into account.

BRIEF DESCRIPTION OF THE SEVERAL VIEWS OF THE DRAWINGS

Features and advantages of the present invention will become apparent, through description of embodiments of the present invention.

DETAILED DESCRIPTION

Preferred embodiments will be described in detail with reference to the accompanying drawings, in which the preferable embodiments of the present invention have been illustrated. The present invention can be implemented in various manners, and thus should not be construed to be limited to the embodiments illustrated herein.

Figure 1:
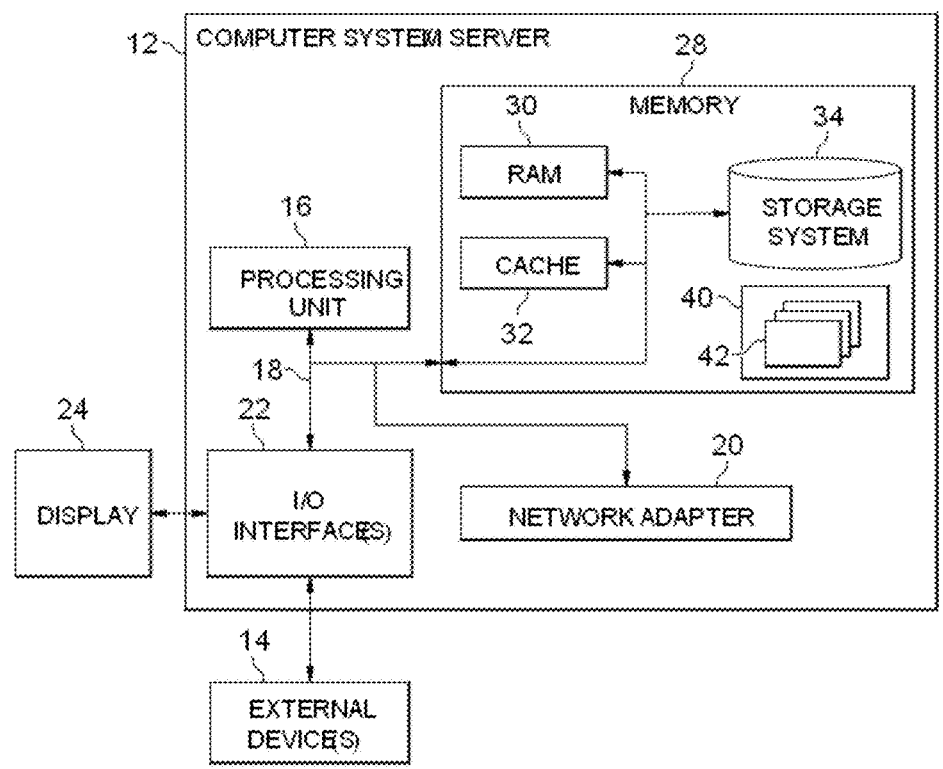
FIG. 1 shows an exemplary computer system/server 12 which is applicable to implement the embodiments of the present invention.

In FIG. 1, in which an exemplary computer system/server 12 is shown in the form of a general-purpose computing device. The components of computer system/server 12 includes, at least one processor or processing units 16, a system memory 28, and a bus 18 that couples various system components.

Bus 18 represents at least one type of bus structure, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media, which are accessible by computer system/server 12, and includes both volatile and non-volatile media, removable and non-removable media.

System memory 28 can include computer system readable media in the form of volatile memory, such as random access memory (RAM) 30 and/or cache memory 32. Computer system/server 12 includes other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by at least one data media interface. As will be further described below, memory 28 can include at least one program product having a set of program modules that are configured to carry out the functions of embodiments of the invention.

Program/utility 40, having a set of program modules 42, can be stored in memory 28 by way of example, and not limitation, as well as an operating system, at least one application program, other program modules, and program data. Each of the operating system, at least one application program, other program modules, and program data or some combination thereof, can include an implementation of a networking environment. Program modules 42 generally carry out the functions and/or methodologies of embodiments of the invention as described herein.

Computer system/server 12 can communicate with at least one external device 14 such as a keyboard, a pointing device, a display 24; at least one device that enables a user to interact with computer system/server 12; and/or any devices (e.g., network card, modem) that enable computer system/server 12 to communicate at least one other computing device. Such communication can occur via Input/Output (I/O) interfaces 22. Further, computer system/server 12 can communicate with at least one network such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components can be used in conjunction with computer system/server 12. Examples, include: microcode, device drivers, redundant processing units, external disk drive arrays, RAID systems, tape drives, and data archival storage systems.

With reference now to the accompanying drawings, a method and an apparatus for determining a location of a mobile device according to embodiments of the present invention will be described in detail.

In an embodiment of the present invention, the mobile device can make a continuous call. Specifically, the mobile device can start the call in a first cell, and can move from the first cell to a second cell during the call. When the mobile device started the call in the first cell, a first CDR was generated at a telecommunication provider, and the first CDR can include information indicating the first cell where the mobile device resided and a time (hereinafter referred to as a first time) at which the mobile device started the call in the first cell. Alternatively, the first CDR can be generated at a certain time (which can be any time) after the mobile device started the call in the first cell, in which case the first CDR can at least include information indicating the first cell where the mobile device resided and the time (hereinafter also referred to as the first time). Furthermore, as long as the mobile device in a calling state moves from the first cell to the second cell, e.g., moves to a common boundary between the first cell and the second cell or moves into the second cell, the mobile device will perform handover from the first cell to the second cell. A second CDR is generated at the telecommunication provider, and the second CDR can at least include information indicating the second cell to which the mobile device is handed over and a time at which the handover is performed. A second time is a time at which the mobile device moves to the common boundary between the first cell and the second cell.

To determine a rough range of the location of the mobile device, the mobile device moves out of the first cell by judging depending if the second CDR described above exists. In a time interval corresponding to the first CDR and the second CDR, the mobile device moves from a certain location within the first cell to the common boundary between the first cell and the second cell. The moving speed of the mobile device is limited, and in turn a maximum movement distance thereof is also limited, the mobile device can only be located at a location from which the mobile device can reach the common boundary within the time interval. The location distance from which any point on the common boundary does not exceed the maximum movement distance. To obtain a more accurate range of the location of the mobile device within the first cell on this information, the rough range of the location of the mobile device can be further narrowed. Based on this understanding, the embodiments of the present invention are proposed.

Figure 2A:
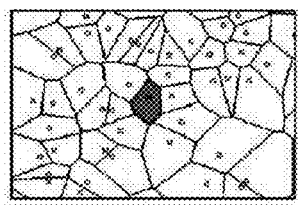
FIG. 2A, FIG. 2B and FIG. 2C illustrate schematic diagrams of coverage of a cell determined by using different methods.
Figure 2B:
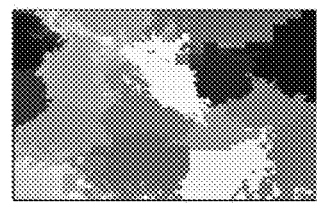
Figure 2C:
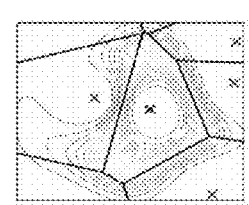

A boundary and coverage of a cell can be determined by using various methods. For example, the coverage of the cell can be determined by using Voronoi tessellation. FIG. 2A illustrates an example of coverage of a cell determined by using the Voronoi tessellation, where the boundary of each cell is in a polygonal shape. To determine boundaries and coverage of respective cells for each location within a target region, a cell which provides a best service quality (e.g., a best signal quality) at the location can be determined in a manner of road test. FIG. 2B illustrates an example of cell coverage determined by using the road test method, where different gray scales are used to represent coverage of respective cells. The cell boundary determined in the above two manners can be called a "hard" boundary. In practice, a reception quality of a radio wave emitted from a base station of a cell at a same location can change from time to time due to reasons such as blockage by a building. The boundary and coverage of the cell can also change from time to time and have uncertainty. Taking such uncertainty into consideration, probability densities of the cell boundary at different locations can be determined by using a transmission model of the radio wave from the base station. The boundary and the coverage of the cell can be determined based on the magnitudes of the probability densities. The cell boundary thus determined can be referred to as a "soft" boundary. FIG. 2C illustrates a schematic diagram of the soft boundary of the cell thus determined, and respective curves in FIG. 2C represent locations with the same probability density, respectively.

Figure 3:
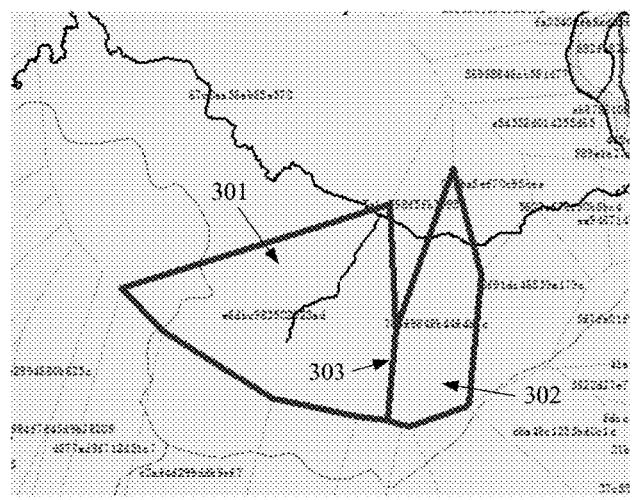
FIG. 3 illustrates a schematic diagram of coverage of a first cell and a second cell.

The boundaries and the coverage of the first cell and the second cell can be determined respectively, so that the common boundary between the first cell and the second cell can be determined. FIG. 3 illustrates a schematic diagram of the coverage of the first cell and the second cell determined by using the Voronoi tessellation. This is drawn on the FIG. 3 map, where reference numbers 301, 302 and 303 indicate the coverage of the first cell, the coverage of the second cell, and the common boundary between the first cell and the second cell respectively of a certain region. Hereinafter, the embodiments of the present invention are described by taking the cell shown in FIG. 3 as an example.

Figure 4:
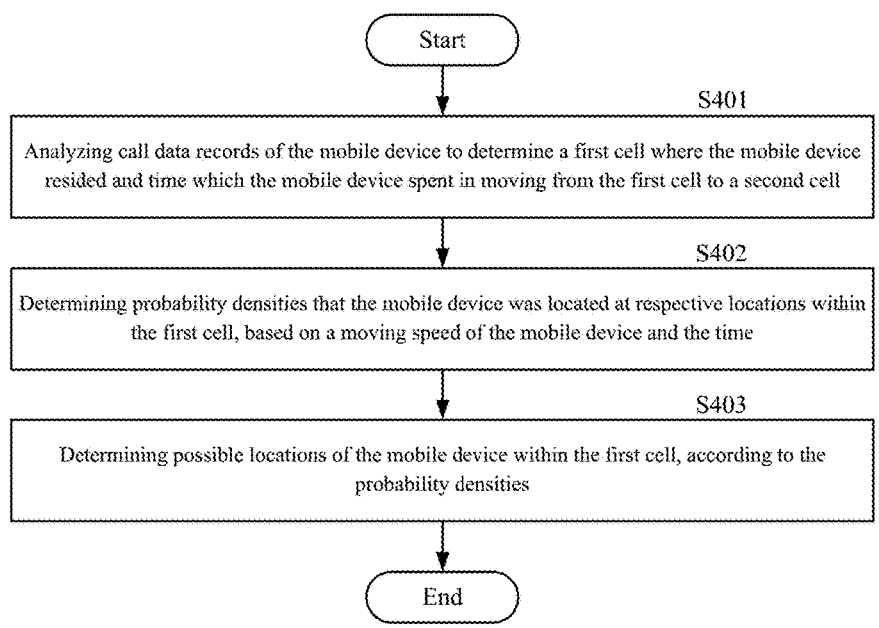
FIG. 4 illustrates a flowchart of a method for determining a location of a mobile device according to an embodiment of the present invention.

With reference now to FIG. 4, a flowchart of the method for determining a location of a mobile device according to an embodiment of the present invention is described. In step S401, CDRs of the mobile device can be analyzed to determine a first cell where the mobile device resided and time which the mobile device spent in moving from the first cell to the second cell. Specifically, the first cell where the mobile device resided can be determined based on the first CDR described above. The second cell to which the mobile device was handed over can be determined according to the second CDR. The time which the mobile device spent in moving from the first cell to the second cell can be determined by calculating a difference between the second time and the first time. In step S402, probability densities that the mobile device was located at respective locations within the first cell can be determined based on a moving speed of the mobile device and the time which the mobile device spent in moving from the first cell to the second cell.

In the embodiment of the present invention, a partial ellipse integral model is proposed to determine the probability densities that the mobile device was located at the respective locations within the first cell. As a result of an initial location (a start point from which the mobile device moves) of the mobile device within the first cell and a final location (a terminal point to which the mobile device moves) on the common boundary between the first cell and the second cell being unknown, any location (hereinafter referred to as a first location) within the first cell can be selected as the start point from which the mobile device moved. Any location (hereinafter referred to as a second location) on the common boundary can be selected as the terminal point to which the mobile device moved. A partial error ellipse is established based on the first location and the second location as well the maximum movement distance of the mobile device to determine all possible locations during the mobile device moving from the first location to the second location and probability densities that the mobile device was located at these locations. In turn, by integrating the probability densities for all possible values of the first location and the second location, the probability densities that the mobile device was located at the respective locations within the first cell can be determined.

Figure 5:
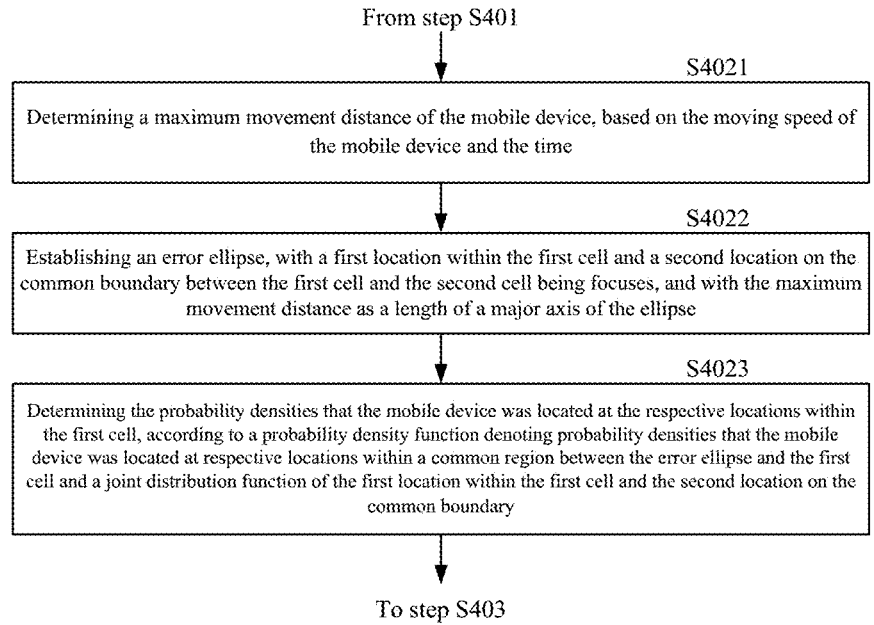
FIG. 5 illustrates detailed operations of step S402 shown in FIG. 4.

With reference now to FIG. 5, operations in step S402 will be described in detail. In step S4021, the maximum movement distance of the mobile device can be determined based on the moving speed of the mobile device and the time which the mobile device spent in moving from the first cell to the second cell. Specifically, the maximum movement distance of the mobile device can be determined by multiplying the moving speed of the mobile device with the time. In order to determine all locations at which the mobile device can arrive during movement, the moving speed of the mobile device can be set to a maximum allowable moving speed of the mobile device. The maximum allowable moving speed can be determined according to a plurality of factors, including, a region where the moving device is located (e.g., a city or a mountainous region), a road where the mobile device is located (e.g., an urban road or a highway), and movement mode of a user who holds the mobile device (e.g., walking or driving). For example, if the first cell is located in the city, the maximum allowable moving speed can be determined to a maximum speed limit for roads in the city, e.g., 80 km/h. Or, if the movement mode of the user who holds the mobile device is walking, the maximum allowable moving speed can be set to a maximum speed of human walking, e.g., 6 km/h. In step S4022, the error ellipse can be established with the first location within the first cell and the second location on the common boundary between the first cell and the second cell being focuses, and with the maximum movement distance being a length of a major axis. As described above, the first location can be any location within the first cell and the second location and can be any location on the common boundary between the first cell and the second cell.

Figure 6:
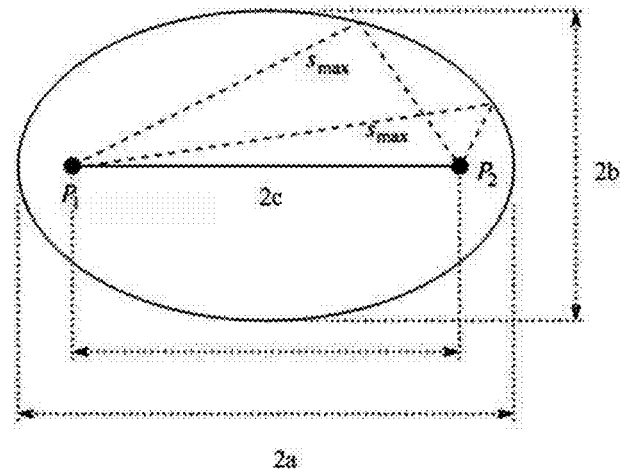
FIG. 6 illustrates a schematic diagram of an error ellipse.
Figure 7:
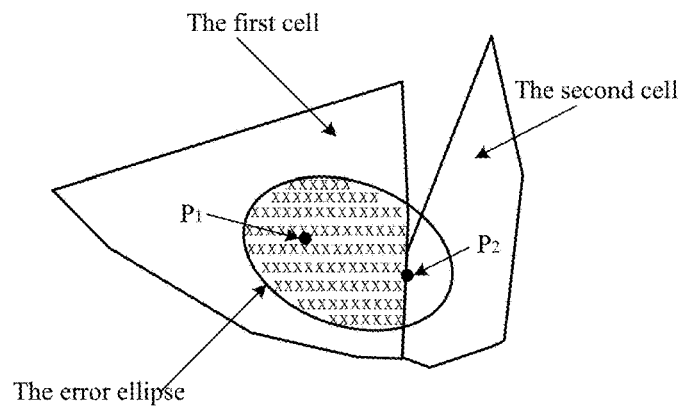
FIG. 7 illustrates a schematic diagram of an error ellipse drawn on the first cell and the second cell shown in FIG. 3A.

FIG. 6 illustrates a schematic diagram of the error ellipse. As shown in FIG. 6, points $P_1$ and $P_2$ are focuses and correspond to the first location and the second location respectively. The length of the major axis of the error ellipse is denoted by $2a$ and is equal to the maximum movement distance (denoted as Smax). A distance between the point $P_1$ and the point $P_2$ is denoted by $2c$ and is known. Therefore, a length of a minor axis of the error ellipse $2b=2\sqrt{a^2-c^2}$ and an area of the ellipse $A=\pi ab$ can be calculated. FIG. 7 illustrates a schematic diagram of the error ellipse drawn based on the first cell and the second cell shown in FIG. 3, where the map which is a background in FIG. 3 is omitted for simplicity.

According to a nature of an ellipse, it can be known that a sum of distances from any point on the ellipse to the two focuses is equal to the length of the major axis of the ellipse, i.e., the maximum movement distance. When the mobile device moves from the first location $P_1$ to the second location $P_2$, no matter which route the mobile device moves along, the mobile device is always located within the error ellipse as long as the moving speed thereof does not exceed the maximum allowable moving speed.

Further, it can be known from the CDRs of the mobile device that before the mobile device arrives at the second location, the mobile device will not exceed the first cell. Thus, the mobile device will not reach a portion within the error ellipse but outside the first cell. Therefore, a range of all locations at which the mobile device can arrive during the movement can be narrowed from the entire error ellipse to a portion of the error ellipse within the first cell, i.e., a common region between the error ellipse and the first cell. The common region is a part of the complete error ellipse established previously, the common region can also be referred to as a partial error ellipse. In the example shown in FIG. 7, the range of all the locations at which the mobile device can arrived during the movement can be narrowed from the entire error ellipse to a portion of the error ellipse located within the first cell (a portion filled with "x").

Without any prior knowledge about the location of the mobile device within the above common region, it can be assumed that the probability densities that the mobile device was located at respective locations in the common region are the same, i.e., the mobile device is assumed to be distributed uniformly within the common region. If the location of the mobile device within the common region is denoted as $l^{1,2}$, a probability density function $f(l^{1,2}|P_1, P_2)$ denoting the probability densities that the mobile device was located at the respective locations within the common region can be expressed as:

$$f(l^{1,2}|P_1, P_2)=1/A-E \quad (1)$$

where A is an area of the above-described error ellipse, and E is an area of a portion of the error ellipse which is located outside the first cell and excluded as described above. Thus, A-E is the area of the common region or the partial error ellipse.

In step S4023, the probability densities that the mobile device was located at the respective locations within the first cell can be determined according to the probability density function denoting the probability densities that the mobile device was located at the respective locations within the common region between the error ellipse and the first cell, and a joint distribution function of the first location within the first cell and the second location on the common boundary.

In step S4022, for the point $P_1$ (the first location) selected from the first cell and the point $P_2$ (the second location) selected from the common boundary, the range of all the locations at which the mobile device can arrive during the movement is determined. The probability densities that the mobile device was located at the respective locations within this range is calculated. However, in practice, the point $P_1$ can be any point within the first cell, and the point $P_2$ can be any point on the common boundary. Thus, the probability density function denoting the probability densities that the mobile device was located at the respective locations within the partial error ellipse determined according to each pair of the point $P_1$ and the point $P_2$ can be integrated for all possible locations of the point $P_1$ and the point $P_2$. This will determine the probability densities that the mobile device was located at the respective locations within the first cell.

Specifically, a joint distribution function $f(P_1, P_2)$ of the point $P_1$ located within the first cell and the point $P_2$ located on the common boundary between the first cell and the second cell can be calculated. In an embodiment of the present invention, it can be assumed that the point $P_1$ and the point $P_2$ are independent of each other and are uniformly distributed in their respective regions, then $f(P_1, P_2)$ can be expressed as:

$$f(P_1, P_2)=f(P_1)\times f(P_2) \quad (2)$$

where $f(P_1)$ is a distribution function of the point $P_i$ located within the first cell, which can be denoted as $1/A_{cell}$, with $A_{cell}$ being the area of the first cell, and $f(P_2)$ is a distribution function of the point $P_2$ located on the common boundary between the first cell and the second cell, which can be denoted as $1/L_{border}$, with $L_{border}$ being a length of the common boundary.

The probability density function $f(l^{1,2}|P_1, P_2)$ can be integrated for all the possible locations of the point $P_1$ and the point $P_2$, so as to determine a probability density function $f(l^{1,2})$ denoting the probability densities that the mobile device was located at the respective locations within the first cell:

$$f(l^{1,2})=\iint f(l^{1,2}|P_1, P_2)\cdot f(P_1, P_2)dP_1 dP_2 \quad (3)$$

According to the probability density function $f(l^{1,2})$, the probability densities that the mobile device was located at the respective locations within the first cell can be determined.

Returning to FIG. 4, in step S403, the possible locations of the mobile device within the first cell can be determined according to the probability densities that the mobile device was located at the respective locations within the first cell. Specifically, a portion whose probability density is 0 within the first cell can be determined as a location at which the mobile device is impossible to arrive, and a portion whose probability density is not 0 within the first cell can be determined as a possible location of the mobile device. Alternatively, a portion whose probability density is less than a first threshold within the first cell can be determined as a location at which the mobile device is impossible to arrive, and the remaining portion within the first cell is determined as a possible location of the mobile device. Further, it is also possible to determine a magnitude of a probability that the mobile device was located at each location according to the calculated probability density of the location.

Figure 8:
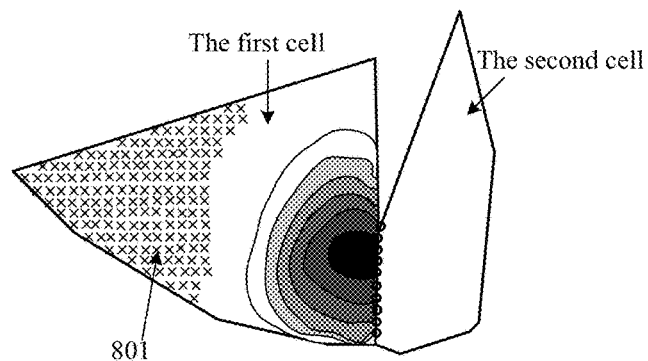
FIG. 8 illustrates a diagram of an example of probability densities that the mobile device was located at respective locations within the first cell, which are determined by the method according to the present invention.

FIG. 8 illustrates a diagram of the probability densities that the mobile device was located at the respective locations within the first cell, which are determined according to the above method. In FIG. 8, a region 801 filled with "x" within the first cell represents a region whose probability density is 0, i.e., a region at which the mobile device is impossible to arrive. A remaining region within the first cell is a region at which the mobile device is possible to arrive, in which respective curves represent locations with same probability densities. A region with a deeper color (substantially a region closer to the common boundary between the first cell and the second cell) has a greater probability density. According to the determined probability densities as shown by circles on the common boundary in FIG. 8, the possible locations of the mobile device on the common boundary can also be known.

When the location of the mobile device is determined, the CDRs of the mobile device are considered to determine a location change of the mobile device. Also, the coverage of the cell and a moving ability of the mobile device per se are taken into account, so that the location determined thereby has a higher accuracy.

Figure 9A:
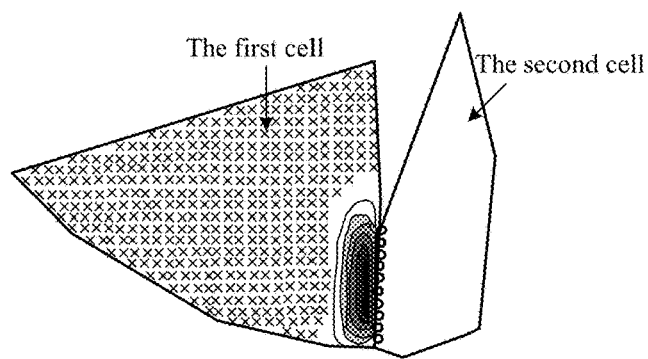
FIG. 9A and FIG. 9B illustrate diagrams of examples of probability densities that the mobile device was located at respective locations with the first cell, which are determined when a maximum allowable moving speed of the mobile device is changed.
Figure 9B:
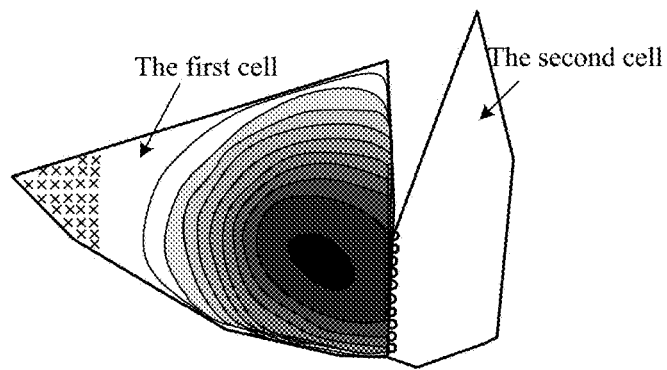

In the above embodiment, the possible locations of the mobile device are determined in a case where the maximum allowable moving speed of the mobile device is known or can be determined according to some factors, however, this is not limitative. In a case where the maximum allowable moving speed of the mobile device is unknown, a plurality of maximum allowable moving speeds can be set. For example, a plurality of maximum allowable moving speeds corresponding to a plurality of movement modes such as walking, driving, taking trains or the like, and the above method can be performed for each of the maximum allowable moving speeds. This is done in order to determine the probability densities that the mobile device was located at the respective locations within the first cell. If the mobile device was located at the respective locations within the first cell determined for a certain maximum allowable moving speed is 0, it can be determined that the maximum allowable moving speed is incorrect. Thus, it can be determined that it is impossible for the mobile device to move in a corresponding movement mode. In a case where the maximum allowable moving speed of the mobile device changes, the probability densities that the mobile device was located at the respective locations within the first cell changes correspondingly. FIG. 9A illustrates the probability densities that the mobile device was located at the respective locations within the first cell, which are determined when the maximum allowable moving speed becomes smaller than that in the case shown in FIG. 8. FIG. 9B illustrates the probability densities that the mobile device was located at the respective locations within the first cell, which are determined when the maximum allowable moving speed becomes greater than that in the case shown in FIG. 8. According to FIG. 9A and FIG. 9B, when the maximum allowable moving speed decreases, the possible locations at which the mobile device was located within the first cell (i.e. a region which is not filled with "x" within the first cell) also decrease. On the contrary, when the maximum allowable moving speed increases, the possible locations of the mobile device at which the mobile device was located within the first cell also increase.

In the above embodiment, the method for determining the location of the mobile device is described with respect to a case of two CDRs (i.e., the first CDR generated when the mobile device was located in the first cell and the second CDR generated when the mobile device moved from the first cell to the common boundary between the first cell and the second cell), however, this is not limitative. The present invention is also applicable for a case of three or more CDRs.

Figure 10:
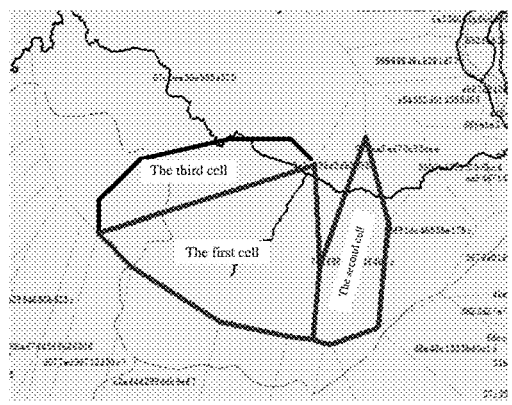
FIG. 10 illustrates a schematic diagram of three cells.

For example, it is assumed that there is a third cell in FIG. 3, which is located on an upper left of the first cell. In FIG. 10, during a call the mobile device enters the first cell from the third cell, and then enters the second cell from the first cell. In this process, three CDRs can be generated. Specifically, when the mobile device arrived at a common boundary between the third cell and the first cell, the mobile device was handed over from the third cell to the first cell. At this time a first CDR can be generated, which includes a time at which the handover was performed, and information indicating the cell to which the mobile device was handed over, etc. Further, when the mobile device performed a data update in any form, e.g. a location update, in the first cell, a second CDR can be generated. This indicates a time at which the update was performed and the cell where the mobile device was located. When the mobile device moved from the first cell to the common boundary between the first cell and the second cell, the mobile device will be handed over from the first cell to the second cell. At this time a third CDR can be generated, which includes a time at which the handover was performed and information indicating the cell to which the mobile device was handed over, etc.

For the movement of the mobile device from the common boundary between the third cell and the first cell to the first cell, a partial error ellipse can be established in a manner similar to that of the embodiment described above. The probability densities that the mobile device was located at respective locations within the first cell can be determined based on the partial error ellipse, thereby the possible locations of the mobile device within the first cell for the movement are determined. In addition, for the movement of the mobile device from the first cell to the common boundary between the first cell and the second cell, a partial error ellipse can be established in a manner similar to that of the embodiment described above. The probability densities that the mobile device was located at the respective locations within the first cell can be determined based on this partial error ellipse. Therefore, the possible locations of the mobile device in the first cell for this movement are determined.

Specifically, for the movement of the mobile device from the common boundary between the third cell and the first cell to the first cell, the probability densities $f(l^{3,1})$ that the mobile device was located at the respective locations within the first cell can be determined by, for example, a formula below:

$$f(l^{3,1}) = \iint f(l^{3,1}|P_3, P_1) \cdot f(P_3, P_1) dP_3 dP_1 \quad (4)$$

where $P_3$ is any point on the common boundary between the third cell and the first cell, $P_1$ is any point within the first cell, $l^{3,1}$ is a location in the partial error ellipse established on the basis of the point $P_3$ and the point $P_1$ in the manner described above, $f(l^{3,1}|P_3, P_1)$ is a probability density function representing probability densities that the mobile device was located at respective locations within the partial error ellipse, and $f(P_3, P_1)$ is a joint distribution function of the point $P_3$ which is located on the common boundary between the third cell and the first cell and the point $P_1$ which is located within the first cell. Likewise, for the movement of the mobile device from the first cell to the common boundary between the first cell and the second cell, the probability densities $f(l^{1,1})$ that the mobile device was located at the respective locations within the first cell can be determined by, for example, a formula below:

$$f(l^{1,2}) = \iint f(l^{1,2}|P_1, P_2) \cdot f(P_1, P_2) dP_1 dP_2 \quad (5)$$

where $P_2$, $l^{1,2} f(l^{1,2}|P_1, P_2)$ and $f(P_1, P_2)$ have the same meanings as those described with respect to the above formula (3).

Figure 11A:
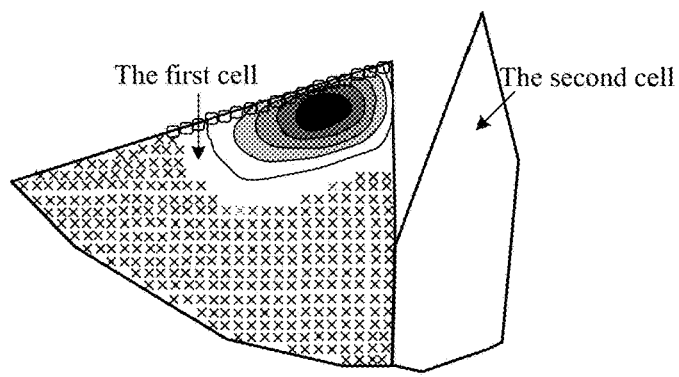
FIG. 11 A and FIG. 11 B illustrate diagrams of examples of probability densities that the mobile device was located at respective locations within a cell in a case where there are three CDRs.
Figure 11B:
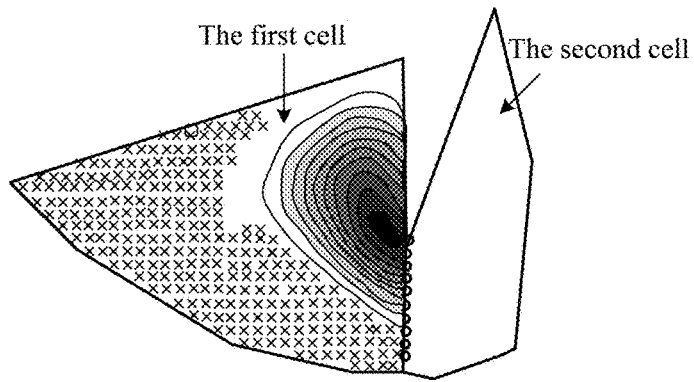

Different from the embodiment of two CDRs as described above, when the probability densities are calculated by using the above formulae (4) and (5), $f(P_3, P_1)$ and $f(P_1, P_2)$ will be restricted by a joint distribution of the three points $P_3$, $P_1$ and $P_2$. Specifically, for the points $P_3$, $P_1$ and $P_2$, since the mobile device moved continuously, i.e., moved continuously from the point $P_3$ to the point $P_2$ through the point $P_1$, the partial error ellipse established based on the points $P_3$ and $P_1$ (which indicates a range of all possible locations of the mobile device when it moved from the point $P_3$ to the point $P_1$) and the partial error ellipse established based on the points $P_1$ and $P_2$ (which indicates a range of all possible locations of the mobile device when it moved from the point $P_1$ to the point $P_2$) must have a common part. The points $P_3$, $P_1$ and $P_2$ can only be points that enable the above two partial error ellipses to have the common part, therefore $P_3$, $P_1$ and $P_2$ in $f(P_3, P_1)$ and $f(P_1, P_2)$ in the above formulae (4) and (5) are limited to only the points $P_3$, $P_1$ and $P_2$ that can enable the above two partial error ellipses to have the common part. In this case, the points $P_3$, $P_1$ and $P_2$ that enable the above two partial error ellipses to have the common part can be found by a method of exhaustion, then $f(l^{3,1})$ and $f(l^{1,2})$ can be calculated. FIG. 11A illustrates a schematic diagram of the probability densities $f(l^{3,1})$ that the mobile device was located at the respective locations within the first cell, which are determined for the movement of the mobile device from the common boundary between the third cell and the first cell to the first cell. The possible locations of the mobile device (i.e., the possible locations of $P_1$) within the first cell for the movement are indicated by a region other than a region filled with "x" within the first cell, and FIG. 11B illustrates a schematic diagram of the probability densities f($l^{1,2}$) that the mobile device was located at the respective locations within the first cell. They are determined for the movement of the mobile device from the first cell to the common boundary between the first cell and the second cell, where the possible locations of the mobile device (i.e., the possible locations of $P_1$) within the first cell for the movement are indicated by a region other than a region filled with "x" within the first cell. According to FIG. 11 A and FIG. 11 B, it can be known that, in the case where there are the above three CDRs, the probability densities that the mobile device was located at the respective locations within the first cell can also be determined, so that the possible locations of the mobile device within the first cell can be known. Similar to the embodiment described above, it is also possible to determine the location of the mobile device on the common boundary between the third cell and the first cell (as shown by circles on the common boundary) and the location of the mobile device on the common boundary between the first cell and the second cell (as shown by circles on the common boundary) according to the probability densities.

The respective embodiments for implementing the method of the present invention have been described with reference to the accompanying drawings hereinbefore. Those skilled in the art can understand that the above method can be implemented in software, in hardware, or in a combination thereof. Further, those skilled in the art can understand that by implementing the respective steps in the above method in software, in hardware, or in a combination thereof, an apparatus for determining a location of a mobile device based on the same inventive concept can be provided. Even if a hardware configuration of the apparatus is the same as that of a general-purpose processing apparatus, the apparatus will exhibit characteristics different from the general-purpose processing apparatus due to a function of software contained therein, so as to form the apparatus according to the embodiment of the present invention. The apparatus of the present invention comprises a plurality of units or modules, which are configured to execute corresponding steps. Those skilled in the art can understand how to write a program to implement actions of the units or modules by reading the present specification.

Figure 12:
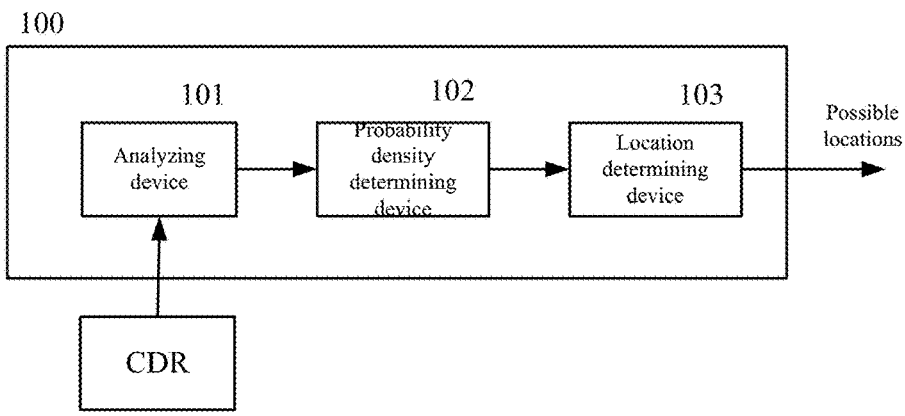
FIG. 12 illustrates a block diagram of an apparatus for determining a location of a mobile device according to an embodiment of the present invention.

With reference now to FIG. 12, the apparatus for determining a location of a mobile device according to the embodiment of the present invention will be described in detail. The apparatus and the method are based on the same inventive concept, the same or corresponding implementation details in the above method are also applicable to the apparatus corresponding to the above method, and these implementation details will not be described below. As described above, the mobile device can perform a continuous call. Specifically, the mobile device started a call in a first cell, and moved from the first cell to a second cell during the call. Correspondingly, when the mobile device was located in the first cell, a first CDR can be generated, and when the mobile device moved from the first cell to the common boundary between the first cell and the second cell, a second CDR can be generated. The first CDR can at least include information indicating the first cell where the mobile device resided and a first time at which the mobile device was located in the first cell, and the second CDR can at least include information indicating the second cell to which the mobile device was handed over and a second time at which the handover was performed.

As shown in FIG. 12, the apparatus 100 for determining the location of the mobile device according to the embodiment of the present invention can include an analyzing device 101, a probability density determining device 102, and a location determining device 103. The analyzing device 101 can analyze CDRs of the mobile device to determine the first cell where the mobile device resided and time which the mobile device spent in moving from the first cell to the second cell. Specifically, the analyzing device 101 can determine the first cell where the mobile device resided based on the first CDR described above, determine the second cell to which the mobile device was handed over according to the second CDR, and determine the time which the mobile device spent in moving from the first cell to the second cell by calculating a difference between the second time and the first time.

The probability density determining device 102 can determine probability densities that the mobile device was located at respective locations within the first cell, based on a moving speed of the mobile device and the time which the mobile device spent in moving from the first cell to the second cell. Briefly, the probability density determining device 102 can determine the probability densities that the mobile device was located at the respective locations within the first cell by using the partial ellipse integral model described above. The probability density determining device 102 can select any location (i.e., the first location described above) within the first cell as a start point of the movement of the mobile device, select any location (i.e., the second location described above) on the common boundary as a terminal point of the movement of the mobile device, and establish the partial error ellipse based on the first location and the second location as well as a maximum movement distance of the mobile device. This will determine all of the possible locations during which the mobile device moved from the first location to the second location and the probability densities that the mobile device was located at these locations. Then, the probability density determining device 102 can determine the probability densities that the mobile device was located at the respective locations within the first cell by integrating the probability densities for all possible values of the first location and the second location.

Figure 13:
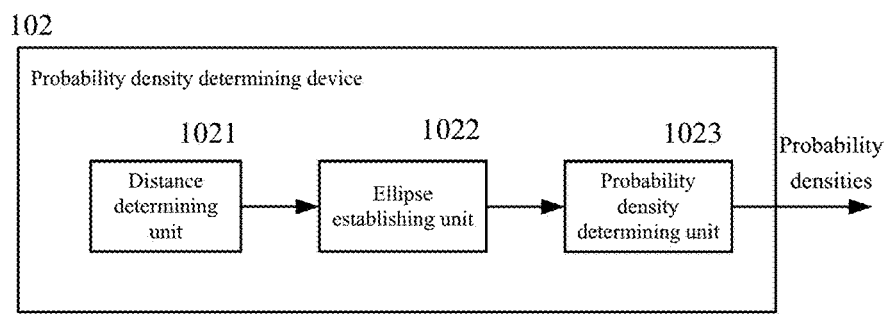
FIG. 13 is a diagram of an exemplary structure of a probability density determining device 102 shown in FIG. 12.

FIG. 13 illustrates an exemplary structure of the probability density determining device 102 shown in FIG. 12. As shown in FIG. 13, the probability density determining device 102 can include a distance determining unit 1021, an ellipse establishing unit 1022 and a probability density determining unit 1023. With the details of operations performed by the probability density determining device 102 being described above with respect to step S402, the probability density determining device 102 (and the respective units therein) are only briefly described herein. The distance determining unit 1021 can determine a maximum movement distance of the mobile device, based on the moving speed of the mobile device and the time which the mobile device spent in moving from the first cell to the second cell. In the embodiment of the present invention, the moving speed of the mobile device can be set to a maximum allowable moving speed of the mobile device, which can be determined according to a variety of factors described above.

The ellipse establishing unit 1022 can establish an error ellipse, with the first location within the first cell and the second location on the common boundary between the first cell and the second cell being focuses and the maximum movement distance being a length of a major axis of the ellipse. The ellipse establishing unit 1022 can establish the error ellipse in the manner described above. The first location can be any location within the first cell, and the second location can be any location on the common boundary between the first cell and the second cell. The ellipse establishing unit 1022 can exclude, from the error ellipse, a portion of the error ellipse which is located outside the first cell. This is to form a partial error ellipse which only includes a portion of the error ellipse within the first cell or a common region between the error ellipse and the first cell. A probability density function denoting probability densities that the mobile device was located at respective locations within the partial error ellipse determined by the pair of the first location and the second location is shown as the above formula (1).

The probability density determining unit 1023 can determine the probability densities that the mobile device was located at the respective locations within the first cell. This is done according to the probability density function denoting the probability densities that the mobile device was located at the respective locations within the common region between the error ellipse and the first cell (i.e., the partial error ellipse) and a joint distribution function of the first location within the first cell and the second location on the common boundary. Specifically, the probability density determining unit 1023 can determine the probability densities that the mobile device was located at the respective locations within the first cell by using the above formula (3).

Returning to FIG. 12, the location determining device 103 can determine possible locations of the mobile device within the first cell according to the probability densities that the mobile device was located at the respective locations within the first cell. For example, the location determining device 103 can determine a portion whose probability density is 0 within the first cell as a location to which the mobile device is impossible to arrive, and determine a portion whose probability density is not 0 within the first cell as a possible location of the mobile device. Alternatively, the location determining device 103 can determine a portion whose probability density is less than a first threshold within the first cell as a location to which the mobile device is impossible to arrive, and determining a remaining portion as a possible location of the mobile device. The location determining device 103 can further determine a magnitude of a probability that the mobile device was located at each location according to a calculated probability density of the location.

With the above apparatus, when the location of the mobile device is determined, the CDRs of the mobile device are considered to determine a location change of the mobile device and the coverage of the cell and a moving ability of the mobile device per se are taken into account. Thus, the determined location of the mobile device has a higher accuracy The apparatus according to the embodiment of the present invention has been described where the maximum allowable moving speed of the mobile device is known or can be determined based on some factors, however, this is not limitative. The apparatus is further applicable to a case where the maximum allowable moving speed of the mobile device is unknown. In this case, a plurality of maximum allowable moving speeds can be set, then the above operation can be performed for each of the maximum allowable moving speeds. This is to determine the probability densities that the mobile device was located at the respective locations within the first cell. If the probability densities that the mobile device was located at the respective locations within the first cell determined for a certain maximum allowable moving speed is 0, it can be determined that the maximum allowable moving speed is incorrect. Thus, it can be determined that it is impossible for the mobile device to move in a corresponding movement mode.

Further, the apparatus for determining the location of the mobile device according to the embodiment of the present invention is also applicable to a case of three or more CDRs. Specifically, in the case where during a call the mobile device entered the first cell from the third cell and then entered the second cell from the first cell, the apparatus can establish a partial error ellipse for the movement of the mobile device from the common boundary between the third cell and the first cell to the first cell in a manner similar to the embodiment described above. To determine the probability densities that the mobile device was located at the respective locations in the first cell based on the partial error ellipse, which will determine the possible locations of the mobile device in the first cell for the movement. In addition, for the movement of the mobile device from the first cell to the common boundary between the first cell and the second cell, establish a partial error ellipse in a manner similar to that of the embodiment described above. To determine the probability densities that the mobile device was located at the respective locations in the first cell based on the partial error ellipse, which will determine the possible locations of the mobile device in the first cell for the movement.

As described above, the location of the mobile device determined by using the method and the apparatus according to the present invention has a higher accuracy. In an embodiment of the present invention, it is also possible to combine the location of the mobile device determined by using the method and the apparatus with other information, in order to further improve the accuracy of the determined location of the mobile device. The information can include GPS data of the mobile device, a credit card consumption record of a user who holds the mobile device at a known location, road network data within a cell, historical trajectory or historical location distribution of the user in the cell, and/or a historical trajectory or historical location distribution of a user who has some similarity to the user within the cell. As an example, if there are GPS data of the mobile device at certain locations within the first cell, it can be determined that the mobile device reached these locations, thereby corresponding values of the above joint distribution function $f(P_1, P_2)$ can be increased to adjust the probability density function $f(l^{1,2})$ determined finally. As another example, if it is determined that the user made a purchase in a certain store according to credit card transaction records of the user, it can be determined that the mobile device reached a location of the store, thereby a corresponding value of the above joint distribution function $f(P_1, P_2)$ can be increased to adjust the probability density function $f(l^{1,2})$ determined finally. As a further example, if the road network data in the cell are known, and it can be determined that it is of a greater probability that the user who holds the mobile device was located on a certain road, a corresponding value of the above joint distribution function $f(P_1, P_2)$ can be increased to adjust the probability density function $f(l^{1,2})$ determined finally.e Moreover, the embodiments of the present invention have been described in the case where the boundaries of the cells are "hard" boundaries, i.e., the joint distribution function $f(P_1, P_2)$ of the point $P_1$ within the first cell and the point $P_2$ on the common boundary between the first cell and the second cell is determined in a case where the boundaries of the cells are fixed, however, this is not limitative. The embodiments of the present invention are also applicable to the case where the boundaries of the cells are "soft" boundaries, in which case it is only necessary to adjust the value of the joint distribution function $f(P_1, P_2)$ according to the "soft" boundaries of the cells. Further, although it is mentioned above that the mobile device performs a continuous call, this is not limitative, and the mobile device can perform a discontinuous call, as long as the mobile device moves from one cell to another cell to produce corresponding CDRs.

Furthermore, it is to be appreciated that the embodiments of the method and the apparatus described above are only illustrative rather than limitative. In other embodiments, it is possible to determine the location of the mobile device in a different manner. For example, as described above, when the mobile device moved from the first cell to the common boundary between the first cell and the second cell within a time interval corresponding to the first CDR and the second CDR, the mobile device can only be located at locations from which the mobile device can reach the common boundary within the time interval. In the case where a requirement on the accuracy of the location of the mobile device is not high, a location in the first cell from which a distance to each point on the common boundary does not exceed the maximum movement distance can be determined as a possible location of the mobile device. If it is desired to determine the location of the mobile device more accurately, any two locations can be selected from all possible locations as focuses to establish a partial error ellipse in the manner described above. A probability density that the mobile device was located at each possible location can be determined by integration, so as to determine the location of the mobile device according to the probability density.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that retains and stores instructions for use by an instruction execution device. The computer readable storage medium can be, for example, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of at least one programming language, including an object oriented programming language such as Smalltalk, C++, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process. The instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which comprises at least one executable instruction for implementing the specified logical function(s). It should also be noted that, in some alternative implementations, the functions noted in the block can occur out of the order noted in the figures. For example, two blocks shown in succession can be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
determining, by a device comprising a processor, probability densities that a mobile device was located at respective locations within a first cell, based on a moving speed of the mobile device and a time that the mobile device moved from the first cell to a second cell, wherein the determining probability densities that the mobile device was located at respective locations within the first cell, based on a moving speed of the mobile device and the time that the mobile device moved from the first cell to the second cell comprises:
establishing an error ellipse, with a first location within the first cell and a second location on a common boundary between the first cell and the second cell being focuses, and with a maximum movement distance as a length of a major axis of the error ellipse; and
determining the probability densities that the mobile device was located at the respective locations within the first cell, according to a probability density function denoting probability densities that the mobile device was located at respective locations within a common region between the error ellipse and the first cell and a joint distribution function of the first location within the first cell and the second location on the common boundary,
wherein the determining probability densities that the mobile device was located at respective locations within the first cell further comprises:
determining the maximum movement distance of the mobile device based on the moving speed of the mobile device and the time that the mobile device moved from the first cell to the second cell; and
determining, by the device, possible locations of the mobile device within the first cell, according to the probability densities, wherein call data records associated with the mobile device include at least a first call data record generated based on the mobile device being determined to be located in the first cell and a second call data record generated based on the mobile device moving from the first cell to a common boundary between the first cell and the second cell, wherein the first call data record includes a first time at which the mobile device was located in the first cell, the second call data record includes a second time at which the mobile device moved to the common boundary between the first cell and the second cell, and the time which the mobile device moved from the first cell to the second cell is a difference between the second time and the first time, wherein the call data records are associated with a continuous call during which the mobile device moved from the first cell to the second cell.

2. The computer-implemented method of claim 1, wherein the probability density function denoting the probability densities that the mobile device was located at the respective locations within the common region between the error ellipse and the first cell is a reciprocal of an area of the common region.

3. The computer-implemented method of claim 1, wherein the moving speed of the mobile device is a maximum allowable moving speed of the mobile device.

4. An apparatus, comprising:
a probability density determining device that comprises:
an ellipse establishing device that establishes an error ellipse wherein a first location within a first cell and a second location on a common boundary between the first cell and a second cell are focuses, and with a maximum movement distance as a length of a major axis of an ellipse; and
a probability density determining device that determines the probability densities that the mobile device was located at the respective locations within the first cell, according to a probability density function denoting probability densities that the mobile device was located at respective locations within a common region between the error ellipse and the first cell and a joint distribution function of the first location within the first cell and the second location on the common boundary; and
a location determining device that determines possible locations of the mobile device within the first cell, according to the probability densities, wherein call data records at least include a first call data record generated based on the mobile device being determined to be located in the first cell, and a second call data record generated based on the mobile device moving from the first cell to a common boundary between the first cell and the second cell, wherein the first call data record includes a first time at which the mobile device was located in the first cell, the second call data record includes a second time at which the mobile device moved to the common boundary between the first cell and the second cell, and the time that the mobile device moved from the first cell to the second cell is a difference between the second time and the first time, wherein the call data records are associated with a continuous call during which the mobile device moved from the first cell to the second cell.

5. The apparatus of claim 4, wherein the probability density determining device comprises:
a distance determining device that determines the maximum movement distance of the mobile device, based on the moving speed of the mobile device and the time.

6. The apparatus of claim 4, wherein the probability density function indicates the probability densities that the mobile device was located at the respective locations within the common region between the error ellipse and the first cell is a reciprocal of an area of the common region.

7. The apparatus of claim 5, wherein the moving speed of the mobile device is a maximum allowable moving speed of the mobile device.

* * * * *